(12) United States Patent
Chen et al.

(10) Patent No.: US 7,244,135 B2
(45) Date of Patent: Jul. 17, 2007

(54) SURFACE CONTACT CARD LATCHING ASSEMBLY

(75) Inventors: Chia-Hua Chen, Tu-Cheng (TW);
Chun-Yu Chen, Tu-Cheng (TW);
Zhou-Quan Zuo, Shenzhen (CN);
Yong Li, Shenzhen (CN)

(73) Assignees: Shenzhen Futaihong Precision Indsutrial Co., Ltd., Shenzhen (CN);
Sutech Trading Limited, Tortola (VG)

( * ) Notice: Subject to any disclaimer, the term of this patent is extended or adjusted under 35 U.S.C. 154(b) by 0 days.

(21) Appl. No.: 11/396,824

(22) Filed: Apr. 3, 2006

(65) Prior Publication Data

US 2006/0286846 A1 Dec. 21, 2006

(30) Foreign Application Priority Data

Jun. 18, 2005 (CN) .................. 2005 1 0035449

(51) Int. Cl.
*H01R 13/62* (2006.01)
(52) U.S. Cl. ...................................... 439/327
(58) Field of Classification Search ........ 439/325–328, 439/629–637
See application file for complete search history.

(56) References Cited

U.S. PATENT DOCUMENTS

| | | | | |
|---|---|---|---|---|
| 5,224,873 A | * | 7/1993 | Duffet et al. ............... | 439/326 |
| 6,129,572 A | * | 10/2000 | Feldman et al. ............ | 439/328 |
| 6,175,505 B1 | * | 1/2001 | Cheng et al. ............... | 361/752 |
| 6,343,018 B1 | * | 1/2002 | Takeyama et al. .......... | 361/737 |
| 6,398,572 B1 | * | 6/2002 | Larsson ...................... | 439/327 |
| 6,761,591 B1 | * | 7/2004 | Zhou .......................... | 439/630 |
| 7,097,511 B1 | * | 8/2006 | Chen et al. ................. | 439/630 |
| 2003/0022537 A1 | * | 1/2003 | Bricaud et al. ............. | 439/152 |
| 2003/0134602 A1 | * | 7/2003 | Haga et al. .................. | 455/90 |
| 2004/0137775 A1 | * | 7/2004 | Taguchi ...................... | 439/328 |
| 2005/0009375 A1 | * | 1/2005 | Pan ............................. | 439/1 |
| 2005/0106925 A1 | * | 5/2005 | Liu ............................. | 439/366 |

* cited by examiner

*Primary Examiner*—Ross Gushi
(74) *Attorney, Agent, or Firm*—Jeffrey T. Knapp

(57) ABSTRACT

A surface contact card latching assembly (100) is formed in a portable electronic device. The latching assembly includes a receiving portion (11) and a latch module (12). The receiving portion is configured for receiving the surface contact card, and a first end of the receiving portion forms an entrance (112) via which the surface contact card can enter or exit. The latch module includes a blocking tab (120) and an elastic latch (122). The blocking tab extends from the receiving portion for partially covering the receiving portion. The elastic latch is disposed at the first end of the receiving portion.

15 Claims, 6 Drawing Sheets

SURFACE CONTACT CARD LATCHING ASSEMBLY

BACKGROUND OF THE INVENTION

1. Field of the Invention

The present invention generally relates to assemblies for holding surface contact cards of portable electronic devices and, more particularly, to a latching assembly for holding a SIM card in a portable electronic device.

2. Discussion of the Related Art

With the development of wireless communication and information processing technologies, portable electronic devices such as mobile phones are now in widespread use. These electronic devices enable consumers to enjoy the convenience of high-tech services anytime and anywhere. Surface contact cards such as subscriber identity module cards (SIM), compact flash cards (CF) and multimedia cards (MMC) having special circuits that are widely used in portable electronic devices to enhance or specialize their functions. For example, a subscriber identity module card (SIM) is placed in a mobile phone to dedicate the mobile phone' functions to the SIM card owner. By changing SIM cards, a single mobile phone can be used by many different SIM card owners as a personal phone.

Referring now to FIG. 1, a typical assembly for holding a SIM card includes a body 42 made of insulating material and a latching structure 44. A receiving groove 420 is defined in the body 42, and a connector 40 including a plurality of contacts is set in the middle of the receiving groove 420. The shape and size of the receiving groove 420 correspond to a SIM card. The latching structure 44 is formed in the body 42, adjacent to the receiving groove 420, and can be moved back and forth along the direction indicated by the arrow shown in FIG. 1.

In use, firstly, the latching structure 44 is moved away from the receiving groove 420, and the SIM card is received in the receiving groove 420. Then, the latching structure 44 is moved adjacent to the receiving groove 420 and located above the receiving groove 420 for latching the SIM card in the receiving groove 420. In the same way, the SIM card can be released by moving the latching structure 44 away from the receiving groove 420.

In the above assembly for holding a SIM card, the latching structure 44 can easily be moved. If a mobile phone employing such an assembly for holding a SIM card drops to ground, a shock can easily force the latching structure 44 to move off the receiving groove 420. As a result, the SIM card will not connect well with the connector 40 or could even be released from the receiving groove 420. Obviously, such a conventional assembly is not a trustworthy way of holding the SIM card steadily in the receiving groove 420.

Therefore, there is a need for a new surface contact card latching assembly, which can hold the surface contact card steadily in a portable electronic device.

SUMMARY OF THE INVENTION

A surface contact card latching assembly is formed in a portable electronic device. In a preferred embodiment, the latching assembly includes a receiving portion and a latch module. The receiving portion is configured for receiving the surface contact card, and a first end of the receiving portion forms an entrance via which the surface contact card can enter or exit. The latch module includes a blocking tab and an elastic latch. The blocking tab extends from the receiving portion for partially covering the receiving portion. The elastic latch is disposed at the first end of the receiving portion.

Other novel features will become more apparent from the following detailed description, when taken in conjunction with the accompanying drawings.

BRIEF DESCRIPTION OF THE DRAWINGS

Many aspects of the surface contact card latching assembly can be better understood with reference to the following drawings. The components in the drawings are not necessarily drawn to scale, the emphasis instead being placed upon clearly illustrating the principles of the present latching assembly. Moreover, in the drawings, like reference numerals designate corresponding parts throughout the several views.

DETAILED DESCRIPTION OF THE EMBODIMENTS

The present latching assembly is suitable for portable electronic devices, such as mobile phones, PDAs, and so on.

Figure 1:
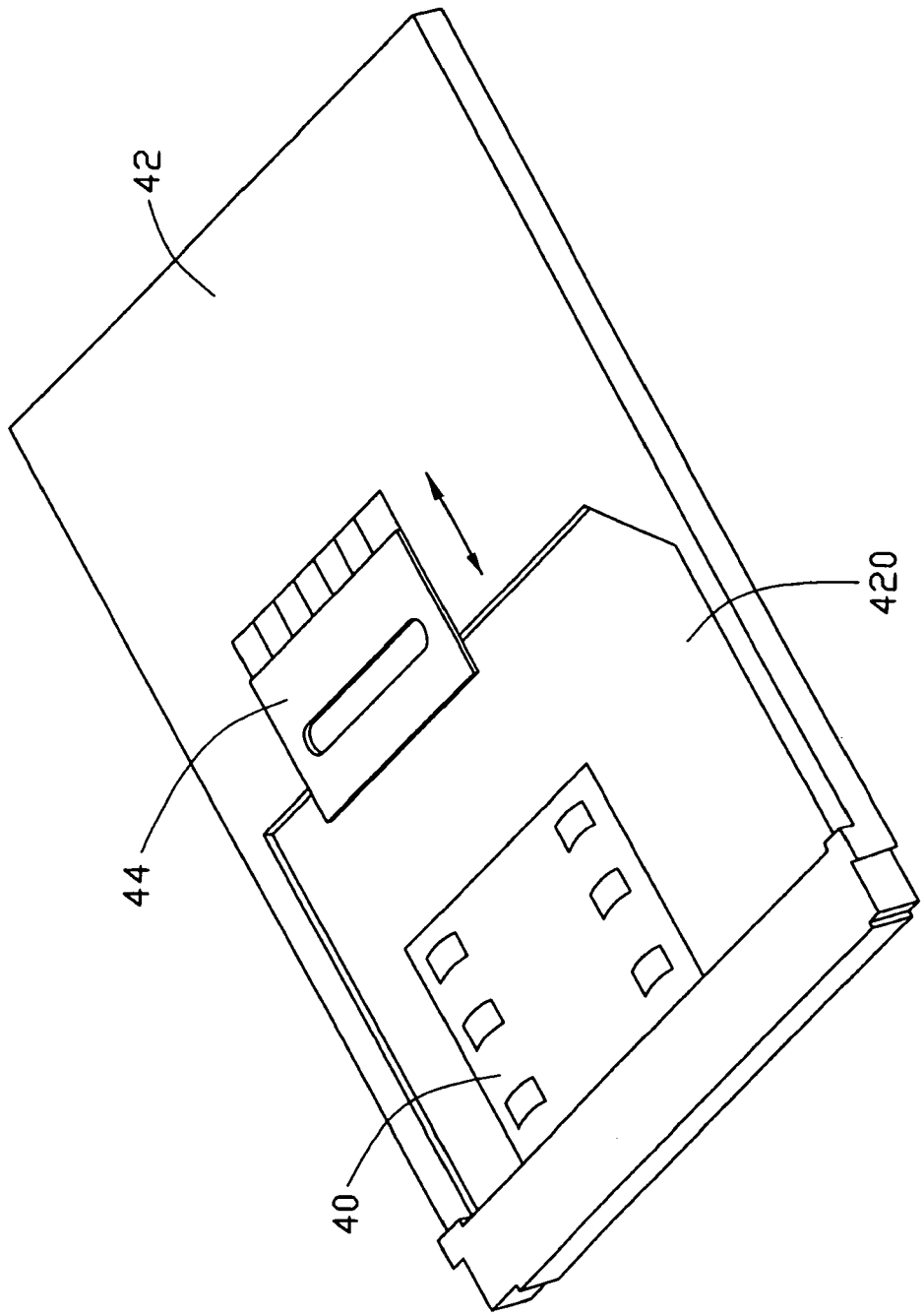
FIG. 1 is an exploded, isometric view of a conventional surface contact card latching assembly.
Figure 2:
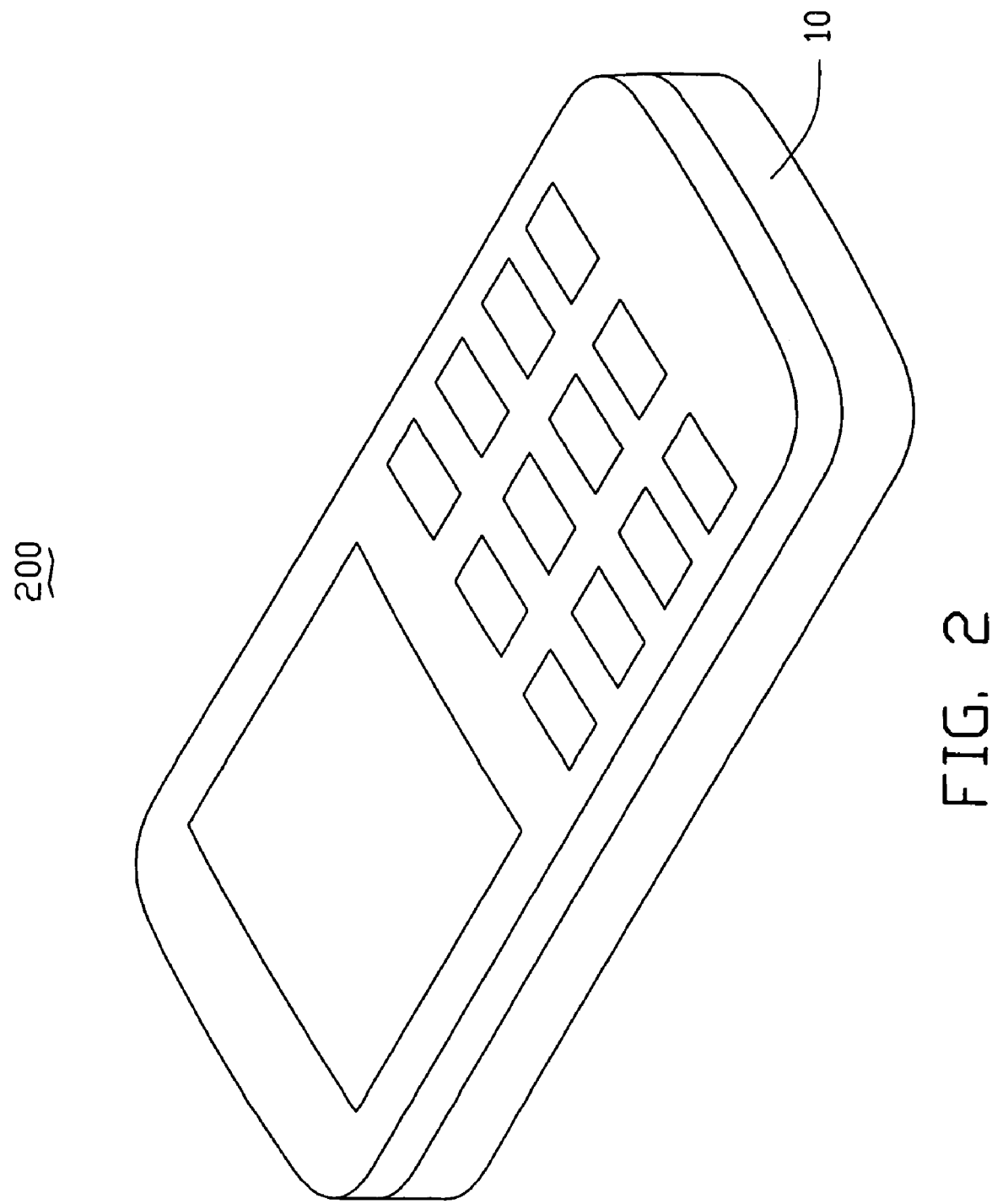
FIG. 2 is an isometric view of a mobile phone accordance with a preferred embodiment of the present invention.
Figure 3:
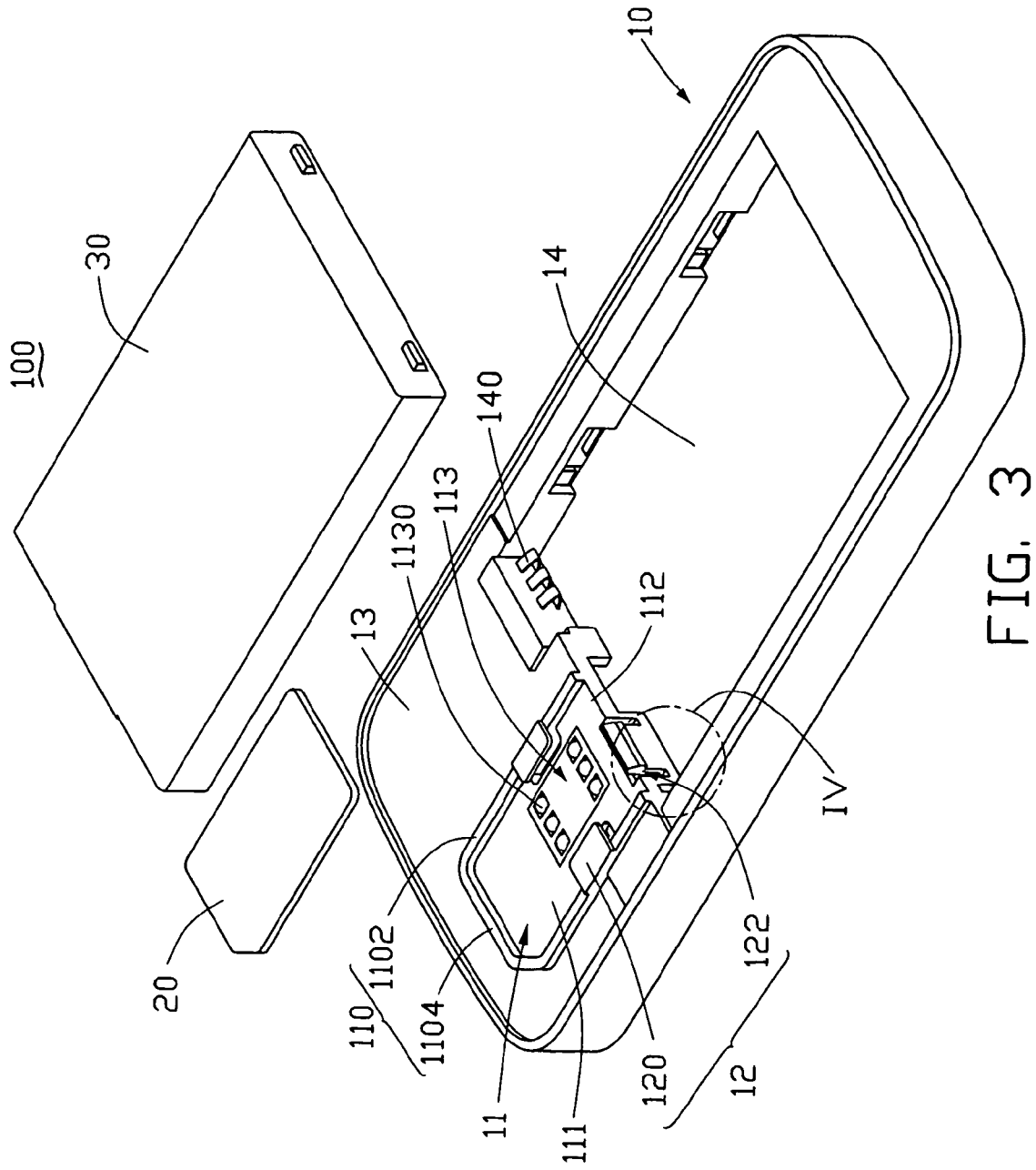
FIG. 3 is an exploded, isometric view of a SIM card latching assembly of FIG. 2.

Referring now to the drawings in detail, FIG. 2 and FIG. 3 show a latching assembly 100 for a SIM card 20 incorporated in a mobile phone/portable electronic device 200. The mobile phone 200 and the SIM card 20 are taken here as an exemplary application, for the purposes of describing details of the latching assembly 100 of the preferred embodiment. The mobile phone 200 includes a main body 10. A partition wall 13 and a receiving cavity 14 for receiving a battery 30 are both formed in the main body 10. The latching assembly 100 is formed in the partition wall 13 of the main body 10, adjacent to the receiving cavity 14. The latching assembly 100 includes a receiving portion 11 and a latch module 12.

The receiving portion 11 defines a receiving space for receiving the SIM card 20, and the shape and size of the receiving portion 11 correspond to the SIM card 20. The receiving portion 11 includes a bar 110 protruding from the partition wall 13 and a base 111 which is a part of the partition wall 13 of the main body 110. The bar 110 has two spaced first bar portions 1102 and a second bar portion 1104 connected the first bar portions 1102. The first bar portions 1102 are parallel, and a distance between the first bar portions 1102 is the same as a width of the SIM card 20. The second bar portion 1104 is disposed at a first end of the receiving portion 11, and an entrance 112 is formed at an opposite second end of the receiving portion 11, adjacent to the receiving cavity 14. The SIM card 20 can enter or exit via the entrance 112. A SIM card connector 113 is set in the middle of the base 111, and the SIM card connector 113 is configured for electrically connecting with the SIM card 20.

The SIM card connector 113 includes a plurality of contacts 1130 protruding from the base 111.

Figure 4:
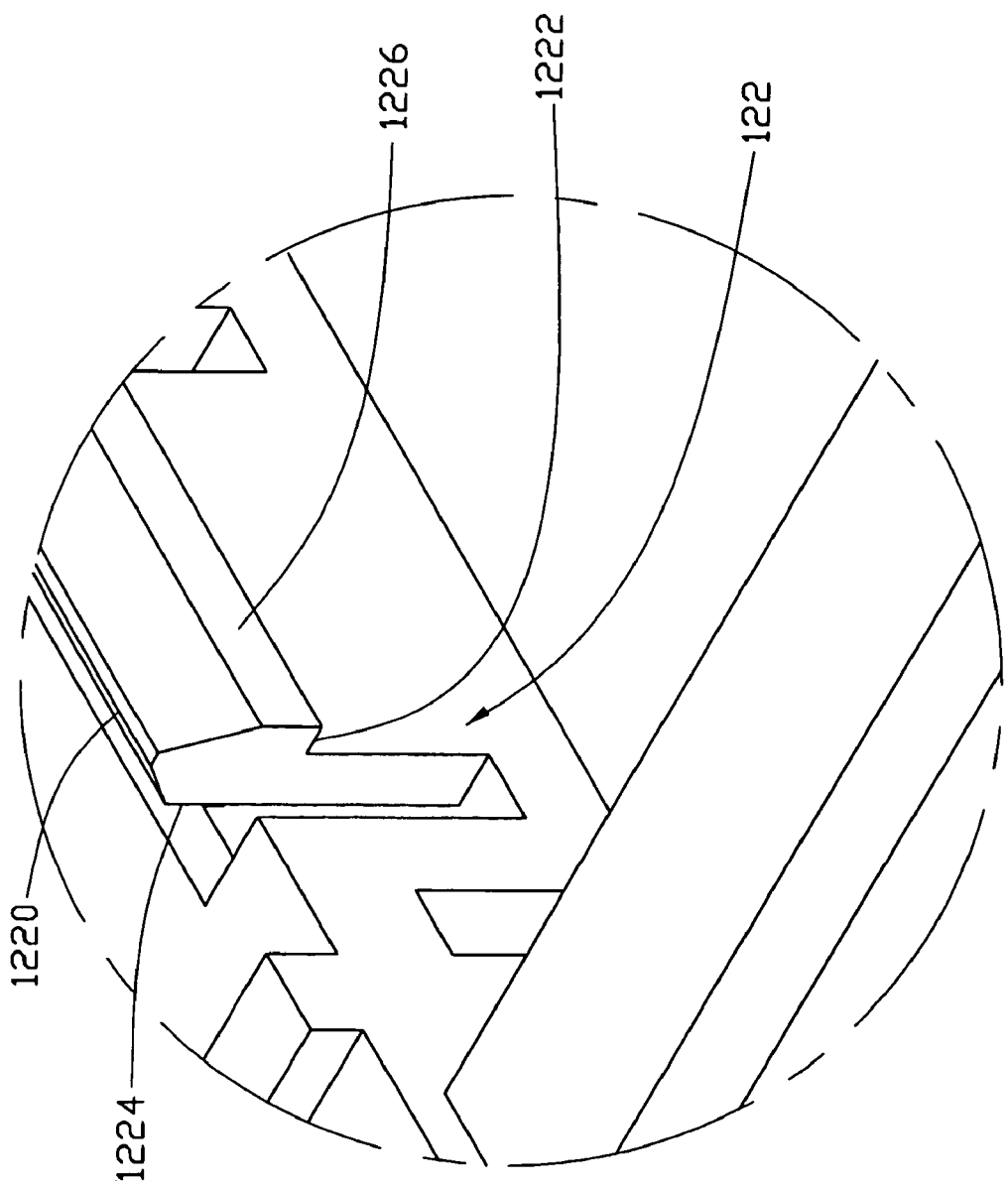
FIG. 4 is an enlarged, isometric view of a circled portion IV of FIG. 3.

Referring also to FIG. 4, the latch module 12 includes at least one blocking tab 120 and an elastic latch 122. In the illustrated embodiment, the number of the blocking tabs 120 is two. The blocking tabs 120 are substantially rectangular pieces. The blocking tabs 120 extend respectively from the first bar portions 1102 of the receiving portion 11 for partially covering the receiving portion 11. In alternative embodiments, the blocking tabs 120 could be replaced with a whole piece extending from the bar 110 of the receiving portion 11 or could be of another suitable shape. The elastic latch 122 is disposed at the second end of the receiving portion 11, adjacent to the receiving cavity 14. The elastic latch 122 is made of elastic material. The elastic latch 122 includes a wedge surface 1220 facing the receiving portion 11 and a step surface 1222 facing the receiving cavity 14. The elastic latch 122 further includes a first resisting surface 1224 connected with the wedge surface 1220 and an opposite facing second resisting surface 1226 connected with the step surface 1222. The first resisting surface 1224 is configured for resisting the SIM card 20 received in the receiving portion 11. The second resisting surface 1226 is configured for resisting the battery 30 received in the receiving cavity 14. The elastic latch 122 and a battery connector 140 configured for electrically connecting with the battery 30 are located in one end of the receiving cavity 14.

Figure 5:
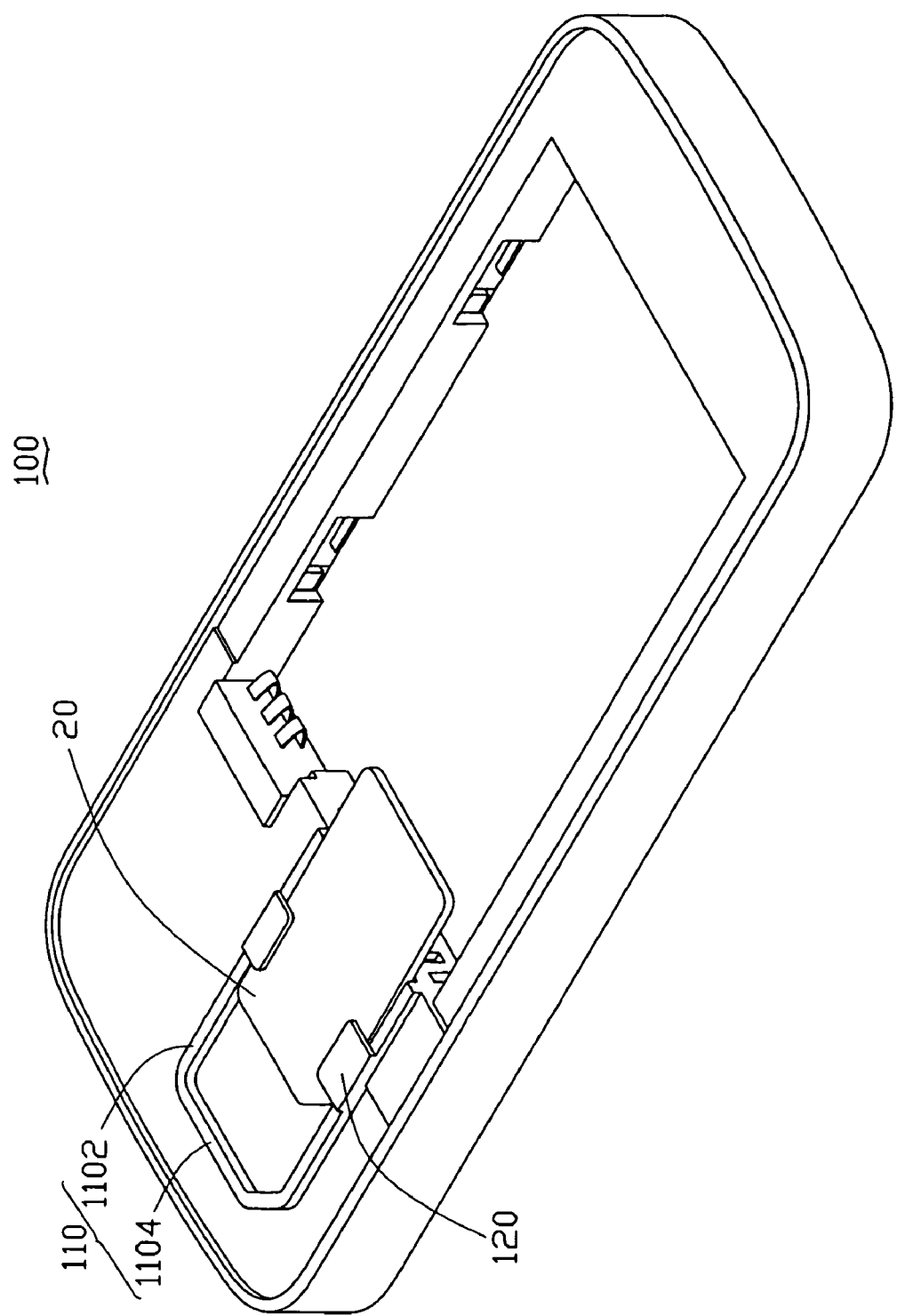
FIG. 5 is an enlarged, isometric view showing the SIM card in a process of being assembled to the latching assembly of FIG. 3.
Figure 6:
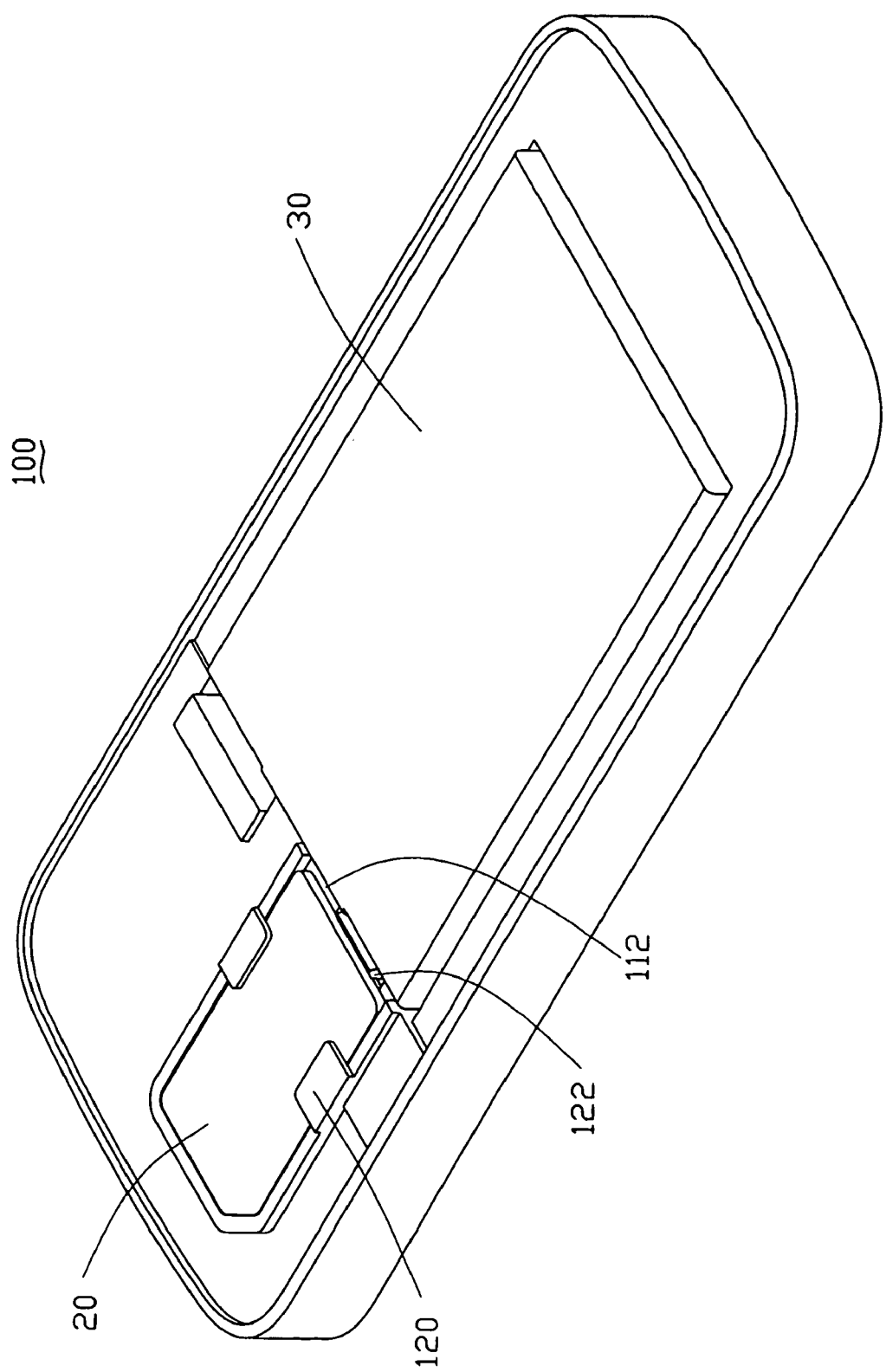
FIG. 6 is similar to FIG. 5, but showing the SIM card fully assembled in the latching assembly.

Referring to FIGS. 5–6, in use, to mount the SIM card 20 in the receiving portion 11, firstly, the SIM card 20 is placed aslant at the entrance 112 of the receiving portion 11 and contacts with the wedge surface 1220 of the elastic latch 122. Secondly, the SIM card 20 is driven to move below the blocking tabs 120 and into the receiving portion 11 by a user pushing the SIM card 20 along an aslant direction of the SIM card 20. Then, the user continues to push the SIM card 20 along the aslant direction of the SIM card 20, the SIM card 20 is received entirely into the receiving portion 11, with the SIM card 20 abutting the first resisting surface 1224 of the elastic latch 122. At this time, the elastic latch 122 exerts a force along the direction of insertion of the SIM card 20 via an elastic deformation, thus holding the SIM card 20 in a horizontal plane. The blocking tabs 120 can prevent the SIM card 20 from moving upwards off the receiving portion 11, thus, the SIM card 20 is held steadily in the receiving portion 11. Finally, the battery 30 is received in the receiving cavity 14, with the battery 30 abutting the battery connector 140 and the second resisting surface 1226 of the elastic latch 122. At this time, the battery connector 140 applies a force to the battery 30. Furthermore, the elastic latch 122 acts to balance the force applied by the battery connector 140 to battery 30, the battery 30 also exerts a reactive force thus the elastic latch 122 abuts the SIM card 20 better.

To remove the SIM card 20, firstly, the battery 30 is removed from the receiving cavity 14. Then, the SIM card 20 is driven to move off the receiving portion 11 from the entrance 112 by the user pulling the SIM card 20 along the elastic latch 122, so the SIM card 20 climbs the wedge surface 1220 of the elastic latch 122. The user continues to pull the SIM card 20 along the elastic latch 122, the elastic latch 122 has a force along an opposite direction to the motion of the SIM card 20, and elastically deforms. When the SIM card 20 is moved out of the entrance 112 of the receiving portion 11 it can be readily taken out.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A surface contact card latching assembly in a portable electronic device body, the portable electronic device body comprising a partition wall, the latching assembly comprising:
 a receiving portion configured for receiving the surface contact card therein, the receiving portion comprising a bar protruding from the partition wall and a base which being a part of the partition wall, a connector configured for electrically connecting with the surface contact card being set in the base, the connector comprising a contact protruding from the base, a first end of the receiving portion comprising an entrance via which the surface contact card can enter or exit; and
 a latch module comprising a blocking tab and an elastic latch, the blocking tab extending from the receiving portion for partially covering the receiving portion, the elastic latch disposed at the first end of the receiving portion.

2. The latching assembly as claimed in claim 1, wherein the portable electronic device body further comprises a receiving cavity for receiving a battery, a battery connector configured for electrically connecting with the battery is disposed in the receiving cavity.

3. The latching assembly as claimed in claim 1, wherein the bar has two first bar portions and a second bar portion connected the first bar portions.

4. The latching assembly as claimed in claim 3, wherein the first bar portions are parallel, and a distance between the first bar portions is the same as a width of the surface contact card, the second bar portion is disposed at a second end opposite to the first end of the receiving portion.

5. The latching assembly as claimed in claim 3, wherein the blocking tab is a rectangular piece, the blocking tab extends from the first bar portion of the receiving portion.

6. A surface contact card latching assembly in a portable electronic device body, the portable electronic device body comprising a receiving cavity for receiving a battery, a battery connector configured for electrically connecting with the battery disposed in the receiving cavity, the latching assembly comprising:
 a receiving portion configured for receiving the surface contact card therein, a first end of the receiving portion comprising an entrance via which the surface contact card can enter or exit; and
 a latch module comprising a blocking tab and an elastic latch, the blocking tab extending from the receiving portion for partially covering the receiving portion, the elastic latch and the battery connector located in one end of the receiving cavity.

7. The latching assembly as claimed in claim 6, wherein the surface contact card is a SIM card.

8. The latching assembly as claimed in claim 6, wherein the elastic latch is made of elastic material, the elastic latch comprises a wedge surface facing the receiving portion and a step surface facing the receiving cavity.

9. The latching assembly as claimed in claim 8, wherein the elastic latch comprises a first resisting surface connected with the wedge surface and an opposite second resisting surface connected with the step surface.

10. A latching assembly for latching a card member in a device body, the device body comprising a receiving cavity for receiving a battery, a battery connector configured for electrically connecting with the battery disposed in the receiving cavity, the latching assembly comprising:
- a receiving portion configured for receiving the card member therein, and comprising an entrance via which the card member can enter or exit; and
- a latch module comprising a blocking portion and an elastic latch, the blocking portion extending from the receiving portion for preventing the card member from moving in a direction perpendicular to the card member, the elastic latch extending from the receiving portion adjacent to the entrance for preventing the card member from moving in a direction parallel to the card member, the elastic latch made of elastic material, and the elastic latch comprising a wedge surface facing the receiving portion and a step surface facing the receiving cavity.

11. The latching assembly as claimed in claim 10, wherein the device body comprises a partition wall, the receiving portion comprises a bar protruding from the partition wall and a base which is a part of the partition wall.

12. The latching assembly as claimed in claim 11, wherein the blocking portion extends from the bar of the receiving portion.

13. The latching assembly as claimed in claim 10, wherein the elastic latch comprises a first resisting surface connected with the wedge surface and an opposite second resisting surface connected with the step surface.

14. An electronic device comprising:
- a device body comprising a card member receiving portion and a battery receiving portion; and
- an elastic member located on the device body, the elastic member having a first resisting surface configured for resisting a card member received in the card member receiving portion, and a second resisting surface configured for resisting a battery received in the battery receiving portion.

15. The electronic device as claimed in claim 14, wherein the first and second resisting surfaces are opposite to each other.

* * * * *

UNITED STATES PATENT AND TRADEMARK OFFICE
CERTIFICATE OF CORRECTION

PATENT NO. : 7,244,135 B2
APPLICATION NO. : 11/396824
DATED : July 17, 2007
INVENTOR(S) : Chia-Hua Chen Page 1 of 1

It is certified that error appears in the above-identified patent and that said Letters Patent is hereby corrected as shown below:

Please replace Section (73) regarding "Assignees" on the Title page of the Patent with the following:
    (73) Assignees: Shenzhen Futaihong Precision
                     Industrial Co., Ltd., Shenzhen (CN);
                     Sutech Trading Limited, Tortola (VG)

Signed and Sealed this

Sixteenth Day of October, 2007

JON W. DUDAS
*Director of the United States Patent and Trademark Office*